United States Patent [19]

Voss et al.

[11] 4,189,515

[45] Feb. 19, 1980

[54] PARTICULATE EXPANDABLE STYRENE POLYMERS HAVING SHORT MINIMUM MOLDING TIMES

[75] Inventors: Harro Voss; Rolf Moeller; Rupert Schick, all of Ludwigshafen; Erhard Stahnecker, Ziegelhausen, all of Fed. Rep. of Germany

[73] Assignee: BASF Aktiengesellschaft, Fed. Rep. of Germany

[21] Appl. No.: 572,421

[22] Filed: Apr. 28, 1975

[30] Foreign Application Priority Data

May 13, 1974 [DE] Fed. Rep. of Germany ....... 2423071

[51] Int. Cl.$^2$ .............................................. B32B 27/08
[52] U.S. Cl. ................................... 428/407; 428/315; 428/403; 428/424.8
[58] Field of Search ............... 428/407, 403, 402, 334, 428/335, 338, 339, 306, 315, 320, 310, 423, 425; 260/77.5 MA; 528/49

[56] References Cited

U.S. PATENT DOCUMENTS

| | | | |
|---|---|---|---|
| 3,029,172 | 4/1962 | Glass | 428/315 |
| 3,102,875 | 9/1963 | Heiss | 260/77.5 MA |
| 3,245,829 | 4/1966 | Beaulieu et al. | 428/315 |
| 3,444,104 | 5/1969 | Immel et al. | 428/407 X |
| 3,640,938 | 2/1972 | Finelli | 428/315 X |
| 3,718,622 | 2/1973 | Camilleri | 260/77.5 MA |
| 3,855,049 | 12/1974 | Klein | 428/425 X |
| 3,908,069 | 9/1975 | Muirhead | 428/407 |

Primary Examiner—Lorraine T. Kendell

Attorney, Agent, or Firm—Keil & Witherspoon

[57] ABSTRACT

Particulate expandable styrene polymers having short minimum molding times which are coated with from 0.005 to 0.5% by weight, based on the expandable styrene polymer, of a mono- and/or poly-urethane melting below 150° C. and obtained by reaction of I (a) aliphatic, cycloaliphatic, aliphatic-cycloaliphatic, araliphatic and aromatic mono- and/or poly-isocyanates with
  (b) linear or branched monoalcohols of from 2 to 24 carbon atoms which may or may not be olefinically unsaturated and/or halogenated, or mixtures of such monoalcohols and
  (c) optionally dihydric to tetrahydric alcohols, the ratio of NCO groups to the total number of hydroxyl groups being from 0.25 to approximately 1:1 and the molar ratio of dihydric to tetrahydric alcohols (if used) to polyisocyanates being not more than 0.4:1; or reaction of II (a) linear or branched aliphatic, cycloaliphatic, aliphatic-cycloaliphatic, araliphatic or aromatic chlorocarboxylates of from 2 to 24 carbon atoms in the alcohol radical, which may or may not be olefinically unsaturated and/or halogenated,
with
  (b) aliphatic, cycloaliphatic, aliphatic-cycloaliphatic, araliphatic and aromatic mono- and/or poly-amines, the ratio of amino groups in the mono- and/or poly-amines to chlorocarboxylates being from 2:1 to 1:1.

5 Claims, No Drawings

PARTICULATE EXPANDABLE STYRENE POLYMERS HAVING SHORT MINIMUM MOLDING TIMES

This invention relates to novel coating agents based on mono- and/or poly-urethanes melting below 150° C. for expandable particulate styrene polymers, which agents have no detrimental effect on the styrene polymers, lead to very fast-cooling moldings showing uniform density distribution throughout and good fusion, and give higher space/time yields during pre-foaming.

The production of shaped articles from foamed styrene polymers is well known. The method most frequently used in industry is to heat the foamable polymer particles containing foaming agents in a first stage to temperatures above their softening point until they have foamed to form a mass of discrete particles of the desired bulk density. This operation is known as "pre-expansion". Good processability of an expandable styrene polymer depends particularly on whether the individual particles form unduly large agglomerates during pre-expansion or not. If such agglomerates form, it is difficult or impossible to convey the prefoamed material and pour it into the molds. The prefoamed material is stored for a number of hours and then further foamed in a perforated, pressure-resistant mold, by renewed heating with superheated steam to cause fusion of the particles to form a molding of dimensions corresponding to those of the cavity of the mold. This second operation is known as "molding". Following such operation, the molding must cool within the mold. This involves waiting until the interior of the molding has reached temperatures below the softening point of the styrene polymer. If the molded article is removed from the mold too soon, the molding may be deformed or spoiled. Obviously, long cooling times increase production costs.

Thus there has been no lack of attempts to reduce the minimum molding time. One very effective method is to coat the expandable styrene polymer particles with organic compounds such as white spirit boiling at from 150° to 200° C., paraffin oil, polyalkylene glycols having molecular weights less than 2000 and ester mixtures derived from glycerol and aliphatic carboxylic acids of from 12 to 18 carbon atoms or silicon dioxide, but this method reduces the expandability of the particles and produces shaped foams having an uneven cellular structure and a high moisture content.

It is also known that expansion of particulate styrene polymers containing foaming agents and having particles which are surface-coated with small amounts of an organic compound capable of dissolving or swelling the styrene polymer leads to shaped articles which can be removed from the mold after relatively short cooling times. This process has a variety of drawbacks, of which the main one is that the coating causes rapid loss of foaming agent from the expandable styrene polymer, which is thus no longer storable.

Another method is to produce foamed articles by heating prefoamed particulate expandable styrene polymers using prefoamed styrene polymers which have been coated with small amounts of organic compounds which are homogeneously miscible with the styrene polymer and have boiling points above 95° C. In this way, short cooling times in the mold are achieved, but the drawback of the process is that it involves an additional processing operation.

It has also been proposed to shorten the minimum molding time by coating the expandable styrene polymer particles with small amounts of an acid amide of the formula R—CO—NHR' where R denotes an aliphatic hydrocarbon radical of from 10 to 24 carbon atoms and R' is preferably hydrogen and can be alkyl of from 1 to 3 carbon atoms. The melting point of the acid amide should be between 35° and 115° C.

The cooling times of the shaped articles in the mold in the above processes are from 20 to 70% of the cooling times of molded articles made from uncoated starting material. However, the short cooling times give no uniform density distribution throughout the shaped article, i.e., a uniform density distribution is only possible with long cooling times. Furthermore, oleic amide, which is described as being particularly suitable in the prior art processes, increases the loss of expanding agent from the expandable polystyrene and thus reduces its storability to a great extent.

The method of coating the particles with carboxamides containing hydroxyl groups, which has also been proposed for a different purpose, shows the same disadvantages.

According to German Published Application 2,133,253, ester mixtures, i.e. mixtures of partial esters of glycerol and fatty acids, which mixtures preferably contain from 30 to 60% by weight of monoester, from 30 to 60% by weight of di-ester and from 5 to 20% by weight of tri-ester, are used as coating materials for shortening the minimum molding time. The drawbacks of this method are that the ester mixtures are obtained from natural products and consequently vary in composition, and they are subject to fungal attack and thus produce green or yellow to brown discoloration of the styrene polymers, which may make it necessary to incorporate fungicides in the coating agents and which increases the time necessary for effecting pre-expansion under pressure as against the use of uncoated material.

It is an object of the present invention to provide a process for shortening the minimum molding time of expandable styrene polymers which does not exhibit the above drawbacks.

The invention relates to particulate expandable styrene polymers showing short minimum molding times and characterized by a coating of from 0.005 to 0.5% by weight, based on the expandable styrene polymer, of a mono- and/or poly-urethane melting below 150° C. and obtained by I reaction of
 (a) aliphatic, cycloaliphatic, aliphatic-cycloaliphatic, araliphatic and aromatic mono- and/or poly-isocyanates with
 (b) linear or branched monoalcohols of from 2 to 24 carbon atoms which may or may not be olefinically unsaturated and/or halogenated, or mixtures of such monoalcohols and
 (c) optionally dihydric to tetrahydric alcohols,
the ratio of NCO groups to the total number of hydroxyl groups being from 0.25 to approximately 1:1 and the molar ratio of dihydric to tetrahydric alcohols (if used) to polyisocyanates being not more than 0.4:1;

or reaction of
II (a) linear or branched aliphatic, cycloaliphatic, aliphatic-cycloaliphatic, araliphatic or aromatic chlorocarboxylates of from 2 to 24 carbon atoms in the alcohol radical, which may or may not be olefinically unsaturated and/or halogenated, with (b) aliphatic, cycloaliphatic, aliphatic-cycloaliphatic, araliphatic and aromatic mono- and/or polyamines, the ratio of amino groups in the mono- and/or polyamines to chlorocarboxylates being from 2:1 to 1:1.

The invention also relates to a process for the manufacture of expandable styrene polymers showing minimum molding times, which is characterized in that particulate expandable styrene polymers are coated with from 0.005 to 0.5% by weight of a mono- and/or polyurethane melting below 150° C. By styrene polymers we mean polystyrene and copolymers of styrene with other $\alpha,\beta$-olefinically unsaturated compounds containing at least 50% by weight of styrene in the form of polymerized units. Suitable comonomers are, for example, $\alpha$-methyl styrene, nuclear halogenated styrenes, nuclear alkylated styrenes, acrylonitrile, acrylates or methacrylates of alcohols of from 1 to 8 carbon atoms, N-vinyl compounds such as vinyl carbazole, maleic anhydride and also small amounts of compounds containing two polymerizable double bonds, for example butadiene, divinyl benzene and butanediol diacrylate.

The styrene polymers may, if desired, contain additions of other materials capable of imparting specific properties to the expandable products. Examples which may be mentioned are flameproofing agents such as trisdibromopropyl phosphate, hexabromocyclododecane, chloroparaffin and synergists for flame-proofing agents, for example ferrocene and highly decomposable organic peroxides, antistatic agents, dyes, lubricants, fillers and/or anti-tack substances for prefoaming such as zinc stearate and melamine-formaldehyde condensates.

The particulate styrene polymers are produced by conventional processes. They may be obtained in the form of beads, cylindrical granules or lumps such as are produced on milling mass polymers. The particles advantageously have diameters of from 0.1 to 6 mm and in particular from 0.4 to 3 mm.

The styrene polymers contain one or more expanding agents uniformly distributed therein. Suitable expanding agents are, for example, normally gaseous or liquid hydrocarbons or halohydrocarbons which are non-solvents for the styrene polymer and boil at temperatures below the softening point of the polymer. Suitable expanding agents are, for example, propane, butane, pentane, cyclopentane, hexane, cyclohexane, dichlorodifluoromethane and trifluorochloromethane. The expanding agents are contained in the styrene polymers generally in amounts of from 3 to 15% by weight, based on the polymer.

The particulate styrene polymers are prefoamed by conventional processes, for example by treatment of the particles containing foaming agent with a stream of steam, by which process they achieve a volume which is from 10 to 100 times their original volume. The particulate prefoamed styrene polymers are processed in molds which are not gastight when closed. By such molds we mean those from which gases, for example air, can escape without egress of the foaming polymer. The prefoamed particles are advantageously heated with steam or mixtures of steam and air. The methods of pre-expansion and molding of styrene polymers are described, for example, in papers by F. Stastny, published in "Kunststoffe", 44th year, 1954, pp. 173 to 180 and in "Der Plastverarbeiter", 1954, pp. 260 to 271.

The important feature of the present invention is the use of mono- and/or poly-urethanes melting below 150° C. as coatings.

The preparation of urethanes is well known. The mono- and/or poly-urethanes suitable for use as coating agents are prepared by reaction of chlorocarboxylates with mono- and/or poly-amines or, preferably, reaction of mono- and/or poly-isocyanates with mono- or polyhydric alcohols in the presence or absence of solvents.

Suitable chlorocarboxylates have the formula

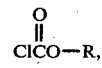

wherein R denotes a linear or branched aliphatic, cycloaliphatic, aliphatic-cycloaliphatic, araliphatic, aromatic, optionally olefinically unsaturated and/or halogenated mono-valent radical of from 2 to 24 carbon atoms and preferably of from 8 to 20 carbon atoms. Specific examples are benzyl, n-octyl, stearyl, $\alpha$-methylheptyl, cyclohexyl, bornyl, phenyl, tolyl, allyl, chlorohexyl and 2,2,2-tribromoethyl chlorocarboxylates.

Suitable amines are aliphatic, cycloaliphatic, aliphatic-cycloaliphatic, araliphatic and aromatic mono- and/or, preferably, poly-amines. Specific examples are monoamines, such as octylamine, laurylamine, palmitylamine, stearylamine, 2-ethylhexylamine, cyclohexylamine, benzylamine, xylidine, aniline, toluidine, diphenylamine, naphthylamine and aminophenyl, diamines such as ethylene diamine, hexamethylene diamine, benzidine, diaminodicyclohexylmethane, phenylene diamines and dianisidine, and polyamines such as triaminobenzene, triamino toluene and triaminotriphenylmethane.

The above amines may be used singly or in the form of mixtures.

The preparation of the mono- and/or poly-urethanes from chlorocarboxylates and mono- and/or polyamines is effected by known methods in the presence or absence of solvents. The starting materials are reacted in amounts such as to give from about 1 to 3 and preferably from 1 to 2 equivalents of amino groups in the mono- and/or polyamines for each mole of chlorocarboxylate in the reaction mixture.

As mentioned above, the mono- and/or poly-urethanes melting below 150° C. and suitable for coating the particulate expandable styrene polymers are preferably prepared from mono- and/or poly-isocyanates and monoalcohols and, optionally, dihydric to tetrahydric alcohols.

The mono- and/or poly-urethanes are suitably prepared from aliphatic, cycloaliphatic, aliphatic-cycloaliphatic, araliphatic and, preferably, aromatic mono- and/or poly-isocyanates. Specific examples are phenyl isocyanate, cyclohexyl isocyanate, hexamethylene-1,6-diisocyanate, 1,4-cyclohexyl diisocyanate, 4,4'-diisocyanatodicyclohexylmethane, isophorone diisocyanate, 4-isocyanatocyclohexyl-4'-isocyanatophenylmethane, xylylene diisocyanates, 4,4'-diphenyl diisocyanate, polyphenylpolymethylene polyisocyanates, 2,4,6-toluylene triisocyanate and, preferably, 2,4- and/or 2,6-toluylene diisocyanate and 2,2'-, 2,4- and/or 4,4'-diisocyanatodiphenylmethane and mixtures of the above compounds.

The other starting materials for the preparation of the mono- and/or poly-urethanes are monoalcohols and, optionally, from dihydric to tetrahydric alcohols.

Suitable monoalcohols are branched or, preferably, linear and have unsaturated double bonds, which may or may not be olefinically unsaturated, or halogen substituents and possess from 2 to 24 and preferably from 8 to 20 carbon atoms in the alcohol radical. Examples of suitable alcohols are unsaturated alcohols such as allyl alcohol, crotyl alcohol and geraniol, halogenated alcohols such as 2,2,2-trichloroethanol and 1,1,1-trichloropropanol, cycloaliphatic alcohols such as cyclopentanol and cyclohexanol, alcohols having branched alkyl radicals such as isobutanol, isodecanol, isoamyl alcohol and ethylhexanol and linear alcohols such as n-amyl, n-hexyl, n-octyl, capryl, decyl, lauryl, cetyl and stearyl alcohols. We prefer to use 2-ethylhexanol, isodecanol and stearyl alcohol.

It may be advantageous to incorporate small amounts of low molecular weight dihydric to tetrahydric alcohols into the monoalcohols used for preparing the di- and/or poly-urethanes. Suitable alcohols of this kind are, for example, diols such as ethylene glycol, diethylene glycol, propanediol and diethanolamine, triols such as glycerol, trimethylolpropane and triethanolamine and tetrahydric alcohols such as erythritol and pentaerythritol. We prefer to use the trihydric alcohols glycerol and trimethylolpropane.

The mono- and/or poly-isocyanates and monoalcohols and, optionally, dihydric to tetrahydric alcohols are reacted in such amounts that the ratio of NCO groups to the total number of hydroxyl groups is from 1.25:1 to approximately 1:1 and is preferably 1:1 and the molar ratio of dihydric to tetrahydric alcohols (if used) to di- and/or poly-isocyanates is less than 0.4:1 and preferably less than 0.2:1.

The preparation of urethane and/or polyurethane from the said isocyanates and alcohols is carried out by conventional methods in solution, in inert solvents or in the melt, optionally in the presence of conventional catalysts.

The mono- and/or poly-urethanes suitable for use as coatings possess molecular weights of from 200 to 3000 and preferably from about 400 to 1200 and have softening points below 150° C. and preferably from 50° to 130° C. and more preferably between 80° and 120° C.

The mono- and/or poly-urethanes may be used singly or in the form of mixtures having their major softening range within the ranged stated above, although the melting points of individual ingredients may, in some cases, be outside the said range.

The mono- and/or poly-urethanes are present, at least to a major extent, in the form of a layer on the surface of the particulate expandable polystyrene particles, substantially uniformly distributed thereon. The method of application is not critical and may, for example, take the form of simple tumbling of the finely divided mono- and/or polyurethane powder onto the particulate expandable styrene polymer in conventional mixers. Alternatively, the mono- and/or poly-urethane may be applied from aqueous dispersion or from a solution in an organic solvent, the water or solvent being removed during application. Yet another alternative is to add the mono- and/or poly-urethanes to the styrene bead polymerization mixture at or near the end of the suspension polymerization process.

The amount of mono- and/or polyurethanes used is between 0.005 and 0.5% and preferably between 0.01 and 0.3%, by weight of the expandable styrene polymer. The amount used is particularly dependent on the particle size of the particulate expandable polystyrene, since small particles have correspondingly larger specific surface areas and consequently a larger amount of coating is required for a given rate of application of mono- and/or poly-urethane per unit of surface area.

The styrene polymers coated in the manner of the present invention have the following advantages: The minimum molding times are from 8 to 20% of the minimum molding times achieved with the uncoated expandable styrene polymers.

Using the coatings of the invention it is possible to achieve the same minimum molding times with much less coating agent than is required in the case of the prior art products. Furthermore, the foamed articles made according to the process of the invention show a very uniform density distribution. This is of great importance, for example in the manufacture of foamed panels from blocks where certain minimum densities have to be guaranteed.

Moreover, the time required for pre-expansion under pressure is much shorter than, for example, when glycerol carboxylates are used and is in some cases shorter than that required by uncoated styrene polymers.

Finally, the water absorption of the expandable styrene polymers coated according to the invention is much less, during molding with steam, than in the case of expandable styrene polymers which are uncoated or coated with, say, paraffin oil.

None of the above advantages was foreseeable.

The minimum molding times of the foamed articles are conveniently determined by the following method. The prefoamed styrene polymers are foamed to completion in a mold in the center of which there is disposed a pressure probe. The time is measured from the commencement of cooling to the point at which no more pressure is indicated in the interior of the molded article. Experience has shown that the moldings may then, and not earlier, be removed from the mold without risk of subsequent expansion.

The shaped articles made from styrene polymers coated in the manner of the invention show very satisfactory fusion and are dimensionally stable.

In the following Examples the parts are by weight and the percentages are based on the weight of the expandable styrene polymer.

EXAMPLES 1 to 14

(A) Preparation of polystyrene foam 10,000 g of expandable polystyrene beads having a particle diameter of from about 1.2 to 1.8 mm and containing from about 6 to 7% w/w of pentane as expanding agent are coated in a mixer with the mono- and/or poly-urethanes of the invention or mixtures thereof. To this end, the mono- and/or poly-urethanes are finely pulverized and are passed through a sieve having a mesh width of less than 0.4 mm.

9500 g of the coated material are then prefoamed in a pressure pre-expander at 0.3 atmospheres gauge using steam to produce material having a bulk density of about 16 g/l, whereupon the material is stored for 24 hours in an air-permeable container. The material thus stored is then poured into a mold measuring 1016×1016×505 mm and is molded at a steam pressure of 0.8 atmosphere gauge to form a block of foam.

After drying, the foamed block is cut into panels having a thickness of 2 cm by means of electrically heated wires. The panels of foam are fractured down the center line and the percentage of welded beads in the fractured surface is determined. Welded beads are those which are torn apart when the panel is fractured whilst unwelded beads separate at their interfaces.

In the Comparative Examples the above method is followed except that either no coating is used or a glycerol carboxylate is used as coating.

(b) Preparation of coatings

EXAMPLE 1

To a mixture of 270 parts (1 mole) of stearyl alcohol and 400 parts of toluene there are added, with stirring at 50° C., 87 parts (0.5 mole) of a mixture of 2,4- and 2,6-toluylene diisocyanate in a ratio of 80:20 by weight. The reaction mixture is then stirred for 6 hours under reflux and the solvent then distilled off under reduced pressure. After cooling, the diurethane mixture, which has a softening range of from 97° to 101° C., is comminuted and the portion having particle sizes smaller than 0.4 mm is used as coating agent.

EXAMPLE 2

To a mixture of 270 parts (1 mole) of stearyl alcohol and 158 parts (1 mole) of isodecanol there are added, with stirring at 80° C., 250 parts (1 mole) of 4,4'-diisocyanatodiphenylmethane. To complete the reaction, the reaction mixture is stirred for 2 hours at 125° C. and then cooled to room temperature. The resulting product, which has a softening range of from 111° to 116° C., is pulverized and the portion having particle sizes smaller than 0.4 mm is used as coating agent.

EXAMPLE 3

To a mixture of 333 parts (1 mole) of benzylchlorocarboxylate and 400 parts of benzene there are added, dropwise, with stirring at room temperature, 186 parts (2 moles) of aniline or 93 parts (1 mole) of aniline and 121 parts (1 mole) of dimethylaniline. The reaction mixture is then stirred for 5 hours at 50° C., cooled to room temperature and then washed a number of times with saturated sodium bicarbonate solution and then with water. The urethane is precipitated from the benzene solution with petroleum ether, filtered off, dried and comminuted. The portion having particle sizes smaller than 0.4 mm is used as coating.

Further mono- and/or poly-urethanes suitable for use as coating agents are prepared in a manner similar to that described in Examples 1 and 2. The starting materials used, the rate of application of the coating and the properties of the products are listed in Tables I to IV below.

The results show that the minimum molding times are much shorter than when uncoated material or material coated with commercial products is used, or that the same minimum molding times can be achieved much smaller quantities of coating agents.

TABLE I

Composition of the mono- and/or poly-urethanes suitable for use as coatings:

EXAMPLE 4

84 parts (0.5 mole) of hexamethylene-1,6-diisocyanate
135 parts (0.5 mole) of stearyl alcohol
79 parts (0.5 mole) of isodecanol.
Softening range of diurethane: 107° to 112° C.
Prepared similar to the method described in Example 2.

EXAMPLE 5

87 parts (0.5 mole) of an 80:20 w/w mixture of 2,4- and 2,6-toluylene diisocyanate
189 parts (0.7 mole) of stearyl alcohol
26 parts (0.2 mole) of 2-ethylhexanol
10.5 parts (0.1 mole) of diethanolamine.
Softening range of polyurethane: 86° to 97° C.
Prepared in a manner similar to that described in Example 2.

EXAMPLE 6

125 parts (0.5 mole) of 4,4'-diisocyanatodiphenylmethane
108 parts (0.4 mole) of stearyl alcohol
65 parts (0.5 mole) of 2-ethylhexanol
13.4 parts (0.1 mole) of trimethylolpropane.
Softening range of polyurethane: 100° to 107° C.
Prepared in a manner similar to that described in Example 2.

EXAMPLE 7

125 parts (0.5 mole) of 4,4'-diisocyanatodiphenylmethane
135 parts (0.5 mole) of stearyl alcohol
65 parts (0.5 mole) of 2-ethylhexanol.
Softening range of diurethane: 113° to 125° C.
Prepared in a manner similar to that described in Example 1.

EXAMPLE 8

87 parts (1 mole) of an 80:20 w/w mixture of 2,4- and 2,6-toluylene diisocyanate
135 parts (1 mole) of stearyl alcohol
65 parts (1 mole) of 2-ethylhexanol.
Softening range of diurethane: 58° to 75° C.
Prepared in a manner similar to that described in Example 1.

EXAMPLE 9

187.5 parts (0.75 mole) of 4,4'-diisocyanatodiphenylmethane
43.5 parts (0.25 mole) of a mixture of 2,4- and 2,6-toluylene diisocyanate
324.0 parts (1.25 moles) of stearyl alcohol
97.5 parts (0.75 mole) of 2-ethylhexanol.
Softening range of diurethane: 110° to 118° C.
Prepared similar to the method described in Example 2.

TABLE II

| | Processing properties of resulting polystyrene foams | | | | |
|---|---|---|---|---|---|
| Coating agent | Rate of application (w/w) | Prefoaming time at 0.3 at.gauge (seconds) | Bulk density (g/l) | Minimum molding time (minutes) | Efficiency of fusion (%) |
| none | 0 | 35.4 | 15.2 | 126 | 70 |
| glycerol carboxylate | 0.4 | 41.6 | 16.0 | 24 | 60 |
| Example 1 | 0.25 | 34.2 | 15.3 | 15 | 60 |
| Example 2 | 0.25 | 34.7 | 16.0 | 16 | 70 |
| Example 3 | 0.25 | 34.3 | 14.0 | 26 | 50 |
| Example 4 | 0.35 | 35.4 | 14.0 | 20 | 40 |
| Example 5 | 0.3 | 32.5 | 15.0 | 24 | 50 |
| Example 6 | 0.3 | 38.3 | 16.0 | 13 | 50 |
| Example 7 | 0.2 | 33.4 | 16.0 | 20 | 60 |
| Example 7 | 0.25 | 32.6 | 16.0 | 11 | 50 |
| Example 8 | 0.25 | 35.5 | 16.0 | 19 | 50 |
| Example 9 | 0.25 | 40.0 | 16.0 | 25 | 70 |

TABLE III

Compositions of mixtures of mono- and/or poly-urethanes suitable for use as coating agents:

EXAMPLE 10

Component A is prepared as in Example 7 from:
  125 parts (0.5 mole) of 4,4'-diisocyanatodiphenylmethane
  135 parts (0.5 mole) of stearyl alcohol
  65 parts (0.5 mole) of 2-ethylhexanol.

Component B is prepared as in Example 1 from:
  59 parts (0.5 mole) of phenyl isocyanate
  54.0 parts (0.5 mole) of benzyl alcohol.

The polyurethane mixture is prepared by mixing components A and B in a ratio of 80:20 by weight.

EXAMPLE 11

Component A is the same as component A of Example 10.

Component B is prepared in a manner similar to that described in Example 5 from:
  87 parts (0.5 mole) of an 80:20 w/w mixture of 2,4- and 2,6-toluylene diisocyanate
  189 parts (0.7 mole) of stearyl alcohol
  26 parts (0.2 mole) of 2-ethylhexanol
  10.5 parts (0.1 mole) of diethanolamine.

The polyurethane mixture is prepared by mixing components A and B in a ratio of 80:20 by weight.

EXAMPLE 12

Component A is prepared in a manner similar to that described in Example 10 from:
  87 parts (0.5 mole) of an 80:20 w/w mixture of 2,4- and 2,6-toluylene diisocyanate and
  270 parts (1 mole) of stearyl alcohol.

Component B is prepared in a manner similar to that described in Example 2 from:
  59.5 parts (0.5 mole) of phenyl isocyanate and
  135.0 parts (0.5 mole) of stearyl alcohol.

The polyurethane mixture suitable as coating agent is prepared by mixing components A and B in a ratio of 80:20 by weight.

EXAMPLE 13

Component A is the same as component A of Example 10.

Component B is prepared in a manner similar to that described in Example 1 from:
  59.5 parts (0.5 mole) of phenyl isocyanate and
  62.0 parts (0.25 mole) of 2,3-dibromobutanediol-1,4.

The polyurethane mixture is prepared by mixing components A and B in a ratio of 80:20 by weight.

EXAMPLE 14

Component A is the same as component A of Example 10.

Component B is prepared in a manner similar to that described in Example 2 from:
  52.2 parts (0.3 mole) of an 80:20 w/w mixture of 2,4- and 2,6-toluylene diisocyanate and
  64.8 parts (0.6 mole) of benzyl alcohol.

The polyurethane mixture suitable for use as coating agent is prepared by mixing components A and B in a ratio of 80:20 by weight.

The processing properties of the polystyrene foams coated with said polyurethane mixtures are listed in Table IV below.

TABLE IV

Processing properties of polystyrene foams coated with poly-mixtures.

| Coating agent | Rate of application (w/w) | Pre-expansion time at 0.3 at. gauge (seconds) | Bulk density (g/l) | Minimum molding time (minutes) | Efficiency of fusion (%) |
|---|---|---|---|---|---|
| none | 0 | 35.4 | 15.2 | 126 | 70 |
| glycerol carboxylate | 0.4 | 41.6 | 16.0 | 24 | 60 |
| Example 10 | 0.35 | 34.3 | 15.0 | 23 | 60 |
| Example 11 | 0.25 | 35.7 | 14.5 | 25 | 50 |
| Example 12 | 0.25 | 32.6 | 14.5 | 24 | 60 |
| Example 13 | 0.25 | 34.9 | 14.5 | 22 | 60 |
| Example 14 | 0.25 | 35.1 | 14.5 | 22 | 50 |

We claim:

1. Particulate expandable styrene polymers having diameters of from 0.1 to 6 mm, having short minimum molding times and coated with from 0.005 to 0.5% by weight, based on the expandable styrene polymer, or a urethane melting below 150° C. and obtained by I reaction of
  (a) aliphatic, cycloaliphatic, aliphatic-cycloaliphatic, araliphatic and aromatic isocyanates with
  (b) linear or branched monoalcohols of from 2 to 24 carbon atoms, the ratio of NCO groups to the total number of hydroxyl groups being from 0.25 to approximately 1:1; or II reaction of
  (a) linear or branched aliphatic, cycloaliphatic, aliphatic-cycloaliphatic, araliphatic or aromatic chlorocarboxylates of from 2 to 24 carbon atoms in the alcohol radical, with
  (b) aliphatic, cycloaliphatic, aliphatic-cycloaliphatic, araliphatic and aromatic amines, the ratio of amino groups in the amines to chlorocarboxylates being from 2:1 to 1:1.

2. Particulate expandable styrene polymers having short minimum molding times as set forth in claim 1 and coated with a urethane prepared by reaction of
  (a) poly-isocyanates with
  (b) aliphatic monoalcohols of from 8 to 24 carbon atoms.

3. Particulate expandable styrene polymers having short minimum molding times as set forth in claim 1 and coated with a polyurethane prepared by reaction of
  (a) at least one member selected from the group consisting of diphenylmethane diisocyanates, toluylene diisocyanates and their isomer mixtures
  with
  (b) stearyl alcohol.

4. Particulate expandable styrene polymers as set forth in claim 1 wherein dihydric and tetrahydric alcohols are reacted with said isocyanates along with said mono-alcohols, the molar ratio of dihydric to tetrahydric alcohols to polyisocyanates being not more than 0.4:1.

5. Particulate expandable styrene polymers as set forth in claim 3 wherein at least one member selected from the group consisting of 2-ethylhexanol and isodecanol is reacted with said diisocyanates along with said stearyl alcohol.

* * * * *